(12) United States Patent
Honda et al.

(10) Patent No.: US 9,329,075 B2
(45) Date of Patent: May 3, 2016

(54) SEAT OCCUPANCY DETERMINATION DEVICE AND SEAT OCCUPANCY DETERMINATION METHOD (71) Applicant: AISIN SEIKI KABUSHIKI KAISHA, Kariya-shi (JP)

(72) Inventors: Isao Honda, Chiryu (JP); Yoshiaki Tomatsu, Toyoake (JP); Yusuke Takahashi, Toyota (JP); Tomomi Tomizawa, Nisshin (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/492,480

(22) Filed: Sep. 22, 2014

(65) Prior Publication Data

US 2015/0096810 A1 Apr. 9, 2015

(30) Foreign Application Priority Data

Oct. 3, 2013 (JP) ................................. 2013-207798

(51) Int. Cl.
*G01L 1/26* (2006.01)
*G01G 19/08* (2006.01)
*G01G 19/414* (2006.01)
*G01G 23/00* (2006.01)

(52) U.S. Cl.
CPC ............ *G01G 19/08* (2013.01); *G01G 19/4142* (2013.01); *G01G 23/002* (2013.01)

(58) Field of Classification Search
CPC .... G01L 19/142; G01L 19/147; G01G 19/08; G01G 23/002
USPC ............................... 73/819, 862.391, 862.293
See application file for complete search history.

(56) References Cited

U.S. PATENT DOCUMENTS

| 6,070,115 | A | * | 5/2000 | Oestreicher | B60N 2/002 280/735 |
| 6,536,797 | B1 | * | 3/2003 | Reich | B60R 21/01512 180/273 |
| 2002/0043789 | A1 | * | 4/2002 | Lichtinger | B60N 2/002 280/735 |

(Continued)

FOREIGN PATENT DOCUMENTS

| JP | 2002-318113 | 10/2002 |
| JP | 2011-17592 | 1/2011 |

OTHER PUBLICATIONS

U.S. Appl. No. 14/551,195, filed Nov. 24, 2014, Honda, et al.

*Primary Examiner* — Max Noori
(74) *Attorney, Agent, or Firm* — Oblon, McClelland, Maier & Neustadt, L.L.P.

(57) ABSTRACT

A seat occupancy determination device configured to be provided at one of seating portions of a plural vehicle seats includes a pair of seat occupancy amount detection devices detecting a seat occupancy amount increasing and decreasing in response to a change of a load applied to each portion of the seating portion, a seat occupancy state determination device determining a seat occupancy state of the vehicle seat, an unbalanced load detection device detecting a degree of unbalance of the load applied to a right portion and a left portion of the seating portion, and a seat occupancy threshold value setting device setting a seat occupancy threshold value and correcting the seat occupancy threshold value in response to the degree of unbalance of the load applied to the right portion and the left portion of the seating portion based on a detected signal transmitted from the unbalanced load detection device.

7 Claims, 6 Drawing Sheets

(56) References Cited

U.S. PATENT DOCUMENTS

| | | |
|---|---|---|
| 2011/0005843 A1 | 1/2011 | Ito et al. |
| 2011/0095580 A1* | 4/2011 | Inayoshi ................ B60N 2/002 297/217.1 |
| 2011/0285186 A1* | 11/2011 | Demmelmeier ..... B60N 2/0248 297/217.1 |

* cited by examiner

SEAT OCCUPANCY DETERMINATION DEVICE AND SEAT OCCUPANCY DETERMINATION METHOD

CROSS REFERENCE TO RELATED APPLICATIONS

This application is based on and claims priority under 35 U.S.C. §119 to Japanese Patent Application 2013-207798, filed on Oct. 3, 2013, the entire content of which is incorporated herein by reference.

TECHNICAL FIELD

This disclosure generally relates to a seat occupancy determination device and a seat occupancy determination method.

BACKGROUND DISCUSSION

A known seat occupancy determination device is disclosed in JP2011-17592A (hereinafter, referred to as Patent reference 1). According to Patent reference 1, a load sensor is placed between a cushion portion of a vehicle seat and a floor of the vehicle. The seat occupancy determination device disclosed in Patent reference 1 determines a seat occupancy state of the vehicle seat by comparing a total sum of load value detected by the load sensors with a predetermined load threshold value. The known seat occupancy determination device disclosed in Patent reference 1 is provided with the right-left pair of load sensors which are provided only at a rear portion of the cushion portion due to cost reduction measures. Thus, the accuracy of the load value detected by each of the load sensors may vary because the load applied to the cushion portion is unbalanced either in a front direction or a rear direction due to an inclination or a tilt of the vehicle in the front-rear direction Dealing with this inaccuracy of the load value detected by the load sensors, the known seat determination device disclosed in Patent reference 1 determines an inclination state or a tilt state of the vehicle and corrects the load value detected by the load sensors in response to the determined inclination state. In particular, in a state where the vehicle seat is not occupied, that is, the vehicle seat is neither seated by, for example, an adult, an infant or a child, nor fixed with a child safety seat, the determination of the inclination state of the vehicle in the front direction is performed at three levels based on a tensile load value detected by the load sensors. Then, when the vehicle seat is seated by, for example, an adult, an infant or a child, the seat occupancy determination device corrects the total sum of the load value detected by the load sensors to increase in accordance with an immediately preceding determination result of the inclination and compares the corrected load value with the load threshold value. Based on the compared result, whether the vehicle seat is seated by an adult, an infant or a child, or whether a child safety seat is fixed to the vehicle seat is determined.

As described above, the known seat occupancy determination device disclosed in Patent reference 1 corrects a detected load value in response to the determination result of the inclination, or the tilt of the vehicle. Accordingly, the variation of the load value detected by the load sensors may be reduced in a state where the vehicle is inclined or tilted.

The pair of load sensors of the known seat occupancy determination device may be mounted to a front portion and a rear portion of one of a left portion and a right portion of the vehicle seat. When mounting the pair of load sensors to only one of the right portion and the left portion of the vehicle seat, the detection accuracy is enhanced in a case where the pair of load sensors is mounted to a center side of the vehicle. The center side of the vehicle corresponds to the left portion of a passenger seat of a vehicle with left-hand steering wheel when facing a front of the vehicle while corresponding to the right portion of the passenger seat of a vehicle with right-hand steering wheel.

Figure 8:
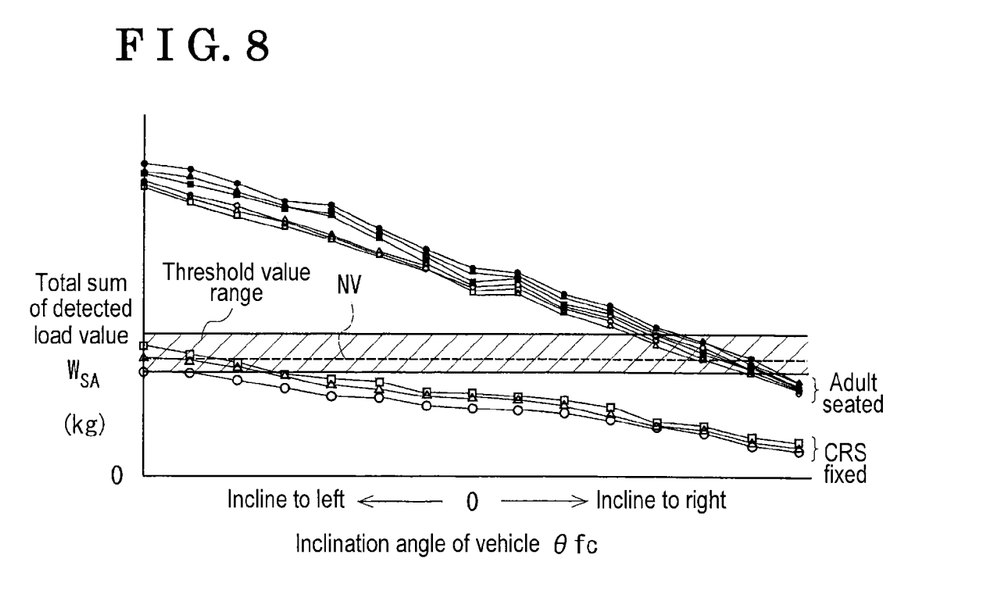
FIG. 8 is a graph showing a relationship between an inclination angle of a vehicle right-left direction and a total sum of a detected load value in each seat occupancy state in a case where a front-rear pair of load sensors is mounted to a left portion of a passenger seat of a vehicle with left-hand steering wheel.

FIG. 8 shows a relationship between an inclination angle, or a tilt angle of the vehicle in a right-left direction and the detected load value in a case where the front-rear pair of load sensor and the load sensor is mounted to the left portion of the passenger seat of the vehicle with left-hand steering wheel instead of mounting the pair of load sensors to a right portion and a left portion of the rear of the vehicle seat. A lateral axis shows the inclination angle, or the tilt angle in the vehicle right-left direction, and a longitudinal axis shows the total sum of the load value detected by the pair of load sensors in each of the seat occupancy state. A dashed straight line NV shown in FIG. 8 divides a determination range whether an adult passenger is seated in the vehicle seat or whether a child safety seat (indicated as CRS in FIG. 8) is fixed to the vehicle seat. A hatching portion corresponds to a threshold value range formed as a predetermined range including the straight line NV to stabilize the determination accuracy. In a case where the total sum of the detected load value is above the threshold value range, it is determined that the vehicle seat is seated by an adult passenger. In a case where the total sum of the detected load value is below the threshold value range, it is determined that a child safety seat is fixed to the vehicle seat 1. In a case where the total sum of the detected load value is somewhere in the threshold value range, the seat occupancy state of the vehicle seat is assumed to be indeterminate, leading to deteriorate the reliability of the determination result.

As shown in FIG. 8, in a case where the vehicle is inclined or tilted in the right direction when the vehicle seat is seated by an adult passenger, the total sum of the detected load value is reduced and enters into or goes below the threshold value range. Accordingly, the determination of the seat occupancy state of the vehicle seat cannot be performed or can be wrongly performed that a child safety seat is fixed to the vehicle seat. On the other hand, in a case where the vehicle is inclined or tilted in the left direction when a child safety seat is fixed to the vehicle seat, the total sum of the detected load value increases and enters into the threshold value range. In those cases, the determination of the seat occupancy state may not be performed.

Figure 9:
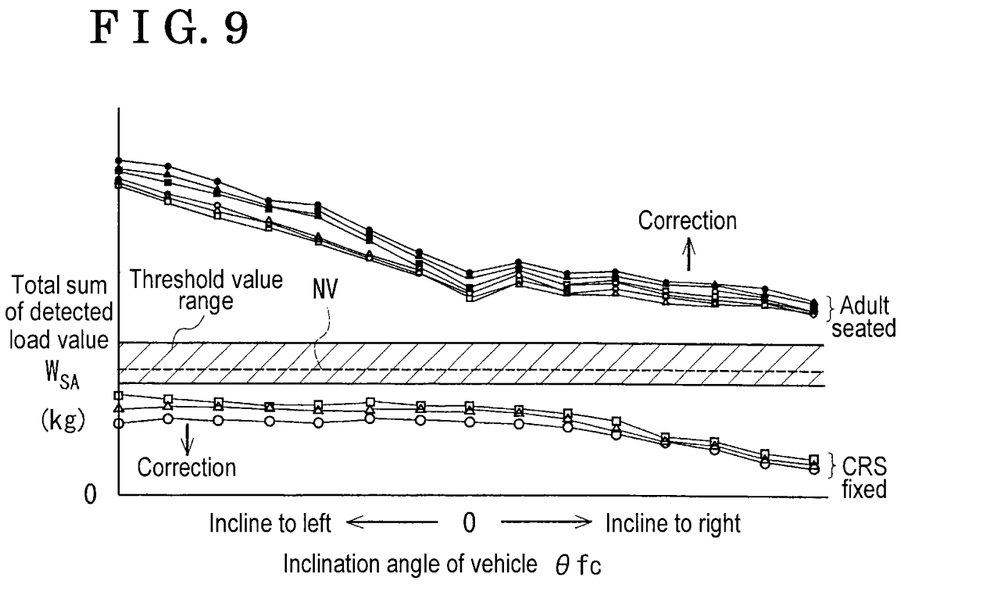
FIG. 9 is a graph showing the relationship between the inclination angle of the vehicle right-left direction and the total sum of the detected load value in each seat occupancy state in a state where the total sum of the detected load value shown in FIG. 8 is corrected.

On the other hand, FIG. 9 shows a relationship between the inclination angle or the tilt angle and the detected load value in a case where data processing is operated based on a method which is for enabling to determine the seat occupancy state regardless of the inclination or the tilt of the vehicle in the right-left direction. According to the method, in a case where the vehicle seat is seated by an adult passenger, the total sum of the detected load value is corrected to increase in response to the inclination angle as long as the vehicle is inclined or tilted in the right direction. In a case where a child safety seat is fixed to the vehicle seat, the total sum of the detected load value is corrected to decrease in response to the inclination angle as long as the vehicle is inclined or tilted in the left direction. As shown in FIG. 9, by correcting the total sum of the detected load value to increase or to decrease, the total sum of the load value comes out of the threshold value range so that the determination of the seat occupancy state in each case can be performed.

However, the determination of the seat occupancy state in each case cannot be performed or can be wrongly performed even though the total sum of the detected load value is corrected. That is, in a case where the inclination angle or the tilt angle of the vehicle is extremely increased, the correction amount has to be equivalently great in order to prevent the total sum of the load value from entering into the threshold value range. However, in a case where, for example, the determination of three or more types of seat occupancy states which include plural threshold value ranges is performed instead of two types of seat occupancy states as shown in FIG. 8, the determination of the seat occupancy state may not be performed precisely because the total sum of the load value may enter into wrong threshold value range in a case where the correction amount is set to be excessively high.

A need thus exists for a seat occupancy determination device and a seat occupancy determination method which are not susceptible to the drawback mentioned above.

SUMMARY

According to an aspect of this disclosure, a seat occupancy determination device configured to be provided at one of seating portions of plural vehicle seats of a vehicle, the plural vehicle seats mounted to the vehicle to be placed next to each other in a right-left direction, the plural vehicle seats in which a passenger is seated to face a front or a rear of the vehicle includes a pair of seat occupancy amount detection devices configured to be provided at a front portion and a rear portion of one of a right side and a left side of the vehicle seat, the pair of seat occupancy amount detection devices detecting a seat occupancy amount increasing and decreasing in response to a change of a load applied to each portion of the seating portion, a seat occupancy threshold value setting device setting a seat occupancy threshold value which corresponds to a threshold value of the seat occupancy amount, a seat occupancy state determination device determining a seat occupancy state of the vehicle seat by comparing a seat occupancy calculation amount calculated based on a detected signal transmitted from the pair of seat occupancy amount detection devices with the seat occupancy threshold value, and an unbalanced load detection device detecting a degree of unbalance of the load applied to a right portion and a left portion of the seating portion in response to a state of the vehicle. The seat occupancy threshold value setting device corrects the seat occupancy threshold value in response to the degree of unbalance of the load applied to the right portion and the left portion of the seating portion based on a detected signal transmitted from the unbalanced load detection device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a seat occupancy determination device BH will be explained referring to FIGS. 1 to 7. The seat occupancy determination device BH of the embodiment corresponds to a device for determining whether an airbag apparatus mounted to a vehicle VE is operable, which is however not limited to this. Hereinafter, a front of a passenger seated in a vehicle seat 1 corresponds to a front of the vehicle seat 1. A right of the passenger seated in the vehicle seat 1 corresponds to a right of the vehicle seat 1, and a left of a passenger corresponds to a left of the vehicle seat 1.

Figure 1:
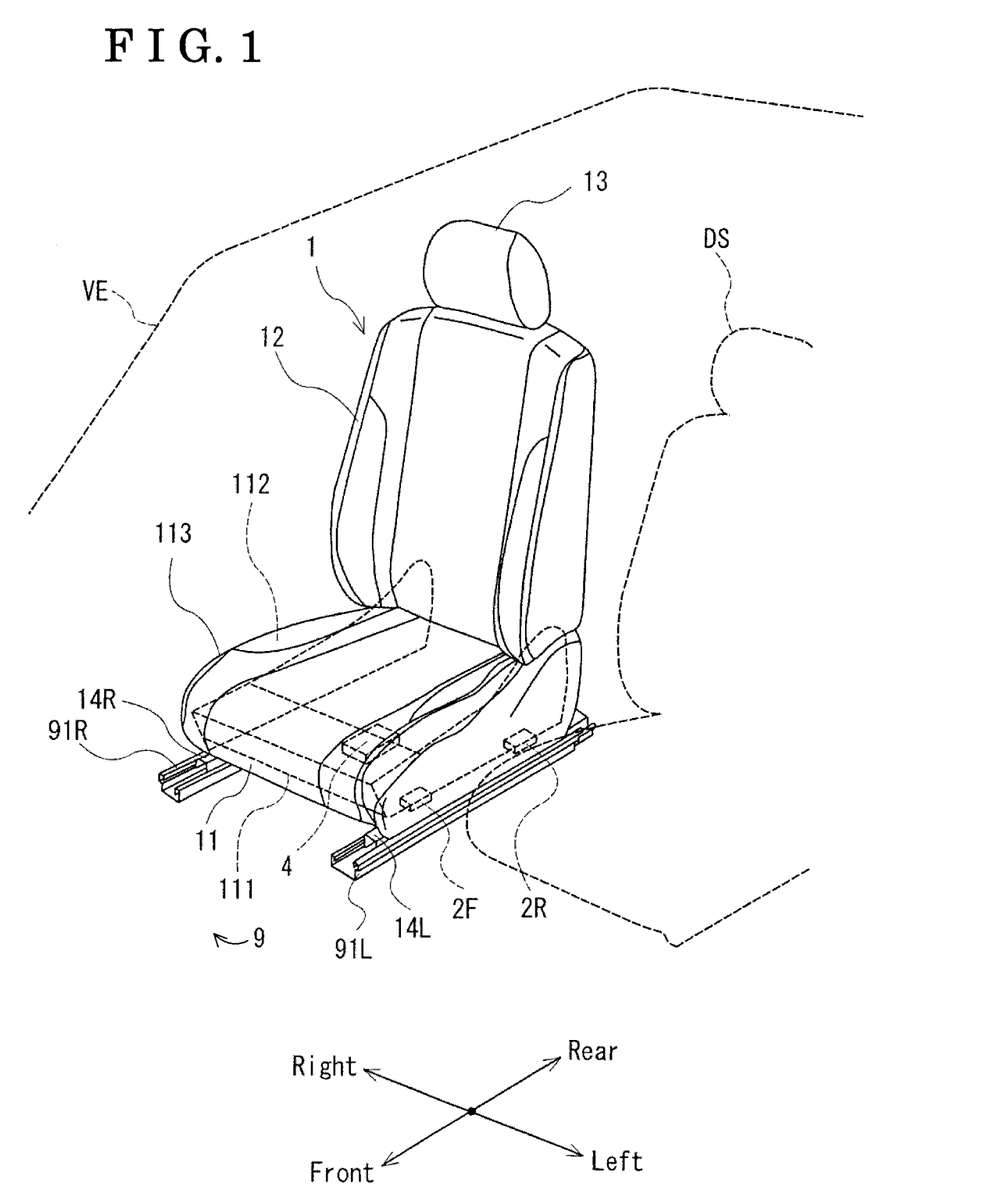
FIG. 1 is a perspective view of a vehicle seat provided with a seat occupancy determination device according to an embodiment disclosed here.

The vehicle seat 1 corresponds to a seat for a passenger mounted on a vehicle with left-hand steering wheel. The left of the vehicle seat 1 corresponds to a substantially center side of the vehicle VE. A vehicle seat DS for a driver is provided at the left of the vehicle seat 1. As shown in FIG. 1, the vehicle seat 1 includes a seat cushion 11 (i.e., serving as a seating portion) in which a passenger is seated to face the front of the vehicle VE. The vehicle seat 1 further includes a seatback 12 mounted to a rear end portion of the seat cushion 11 so that an upper end portion of the seatback 12 is rotatable in the front-rear direction. The seatback 12 serves as a backrest for a passenger. A headrest 13 is mounted to an upper end of the seatback 12 to support a head of a passenger.

The seat cushion 11 is formed by a seat frame 111, a pad member 112 which is positioned above the seat frame 111, and a cover 113 covering a surface of the pad member 112. A right-left pair of an upper rail 14R and an upper rail 14L is mounted to a lower surface of the seat frame 111. The upper rails 14R, 14L movably engage with a pair of lower rails 91R, 91L which are fixed on a floor 9 of the vehicle VE in the front-rear direction, respectively. Accordingly, the vehicle seat 1 is formed so as to be fixed at a position where a passenger desires by moving on the floor 9 in the front-rear direction.

As shown in FIG. 1, a front seat occupancy sensor 2F (i.e., serving as a seat occupancy amount detection device) and a rear seat occupancy sensor 2R (i.e., serving as a seat occupancy amount detection device), or a pair of seat occupancy sensors 2F, 2R, are positioned at a left portion of the seat cushion 11 in the front-rear direction, the seat cushion 11 which is adjacent to the vehicle seat DS for the driver. Alternatively, the front and rear seat occupancy sensors 2F, 2R may be positioned at a right portion of the seat cushion 11 in the front-rear direction. Each of the front and rear seat occupancy sensors 2F, 2R corresponds to a load sensor formed by, for example, a strain gauge and detects a load applied to the cushion 11 downwardly when a passenger is seated in or a baggage is loaded to the vehicle seat 1. In the embodiment, a baggage is loaded on the seat cushion 11 and detected by the front and rear seat occupancy sensors 2F, 2R is referred to as a seat occupancy load (i.e., referred to as a seat occupancy amount) regardless of the load applied when a passenger is seated in the vehicle seat 1, the load applied when a child safety seat is fixed to the vehicle seat 1, or the load applied when a baggage is loaded to the vehicle seat 1. A type, a model, and a detection principle of the front and rear seat occupancy sensors 2F, 2R are not limited specifically.

The front seat occupancy sensor 2F is mounted between a left-end front portion of the seat frame 111 and a front portion of the left upper rail 14L and detects the load applied to a front portion of the seat cushion 11. Similarly, the rear seat occupancy sensor 2R is mounted between a left-end rear portion of the seat frame 111 and a rear portion of the left upper rail 14L and detects the load applied to a rear portion of the seat cushion 11. The front seat occupancy sensor 2F and the rear seat occupancy sensor 2R are mounted to the seat cushion 11 to be spaced apart at a predetermined distance in the front-rear direction. Hereinafter, the front seat occupancy sensor 2F and the rear seat occupancy sensor 2R are collectively referred to as seat occupancy sensors 2F, 2R. A controller 4 is mounted to a lower portion of the seat cushion 11.

Figure 2:
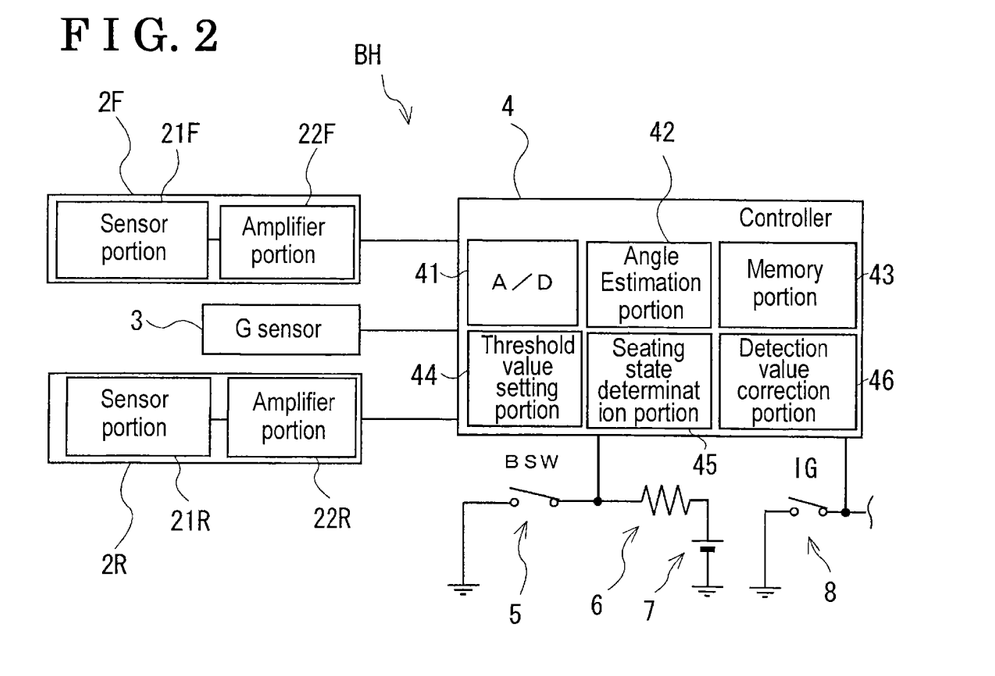
FIG. 2 is a block diagram showing an entire structure of the seat occupancy determination device.

As shown in FIG. 2, the seat occupancy sensors 2F, 2R include sensor portions 21F, 21R and amplifier portions 22F, 22R which amplify detected signals transmitted from the sensor portions 21F, 21R, respectively. The sensor portions 21F, 21R are formed by Wheatstone bridge circuits configured with the four strain gauges, respectively. An acceleration sensor 3 (i.e., serving as an unbalanced load detection device) is mounted to the vehicle VE and detects an acceleration in the right-left direction generated at the vehicle VE. The acceleration sensor 3 outputs a positive value in a case where the acceleration sensor 3 detects the vehicle acceleration in the right direction while outputting a negative value in a case where the acceleration sensor 3 detects the vehicle acceleration in the left direction (see FIG. 3). The vehicle acceleration detected by the acceleration sensor 3 is used for an anti-lock braking system (anti-skid) control, or an ABS control and a vehicle motion control, for example, a stability control of the vehicle VE.

Each of the seat occupancy sensors 2F, 2R and the acceleration sensor 3 are connected to the controller 4. The controller 4 is an electric control device formed by, for example, an input-output device, an arithmetic device and a memory device. The controller 4 includes an analog-digital converter 41, or an A/D converter 41, an angle estimation portion 42 (i.e., serving as an unbalanced load detection device), a memory portion 43, a threshold value setting portion 44 (i.e., serving as a seat occupancy threshold value setting device), a seat occupancy state determination portion 45 (i.e., serving as a seat occupancy state determination device), and a detection value correction portion 46 (i.e., serving as a seat occupancy amount correction device). The A/D converter 41 converts detected signals transmitted from the seat occupancy sensors 2F, 2R and the acceleration sensor 3 into digital signals. The angle estimation portion 42 calculates an inclination angle θfc of the vehicle VE in the right-left direction based on the detected signals transmitted from the acceleration sensor 3. The memory portion 43 accumulates various data required for determining the seat occupancy state. The threshold value setting portion 44 sets a threshold value range TS (i.e., serving as a seat occupancy threshold value) for determining the seat occupancy state in response to the inclination angle θfc of the vehicle VE. The seat occupancy state determination portion 45 determines the seat occupancy state of the vehicle seat 1.

The detection value correction portion 46 corrects a total sum WSA of a detected load value obtained by adding the detected values detected by the seat occupancy sensors 2F, 2R together in response to the inclination angle θfc of the vehicle VE. The total sum WSA of the detected load value corresponds to a seat occupancy calculation amount.

In addition, a buckle switch 5 is provided at a seat belt device of the vehicle seat 1 and connected to the controller 4. A battery 7 of the vehicle VE is connected to the buckle switch 5 via a direct-current resistance 6. When the buckle switch 5 is in an open state (off state), the controller 4 detects a positive terminal voltage (high) of the battery 7 because electricity does not flow through the direct-current resistance 6. When a belt locking tongue and a buckle of the seat belt device engage with each other to bring the buckle switch 5 to a closed state (on state), the controller 4 detects a voltage drop (low) by the direct-current resistance 6 because electricity flows through the direct-current resistance 6. Accordingly, the controller 4 detects that the occupant wears the seat belt. An ignition switch 8 (i.e., serving as a starting operation detection device) of the vehicle VE is connected to the controller 4. The controller 4 detects whether the ignition switch 8 is in an on state or in an off state to detect whether the driver starts the operation of the vehicle VE.

Figure 3:
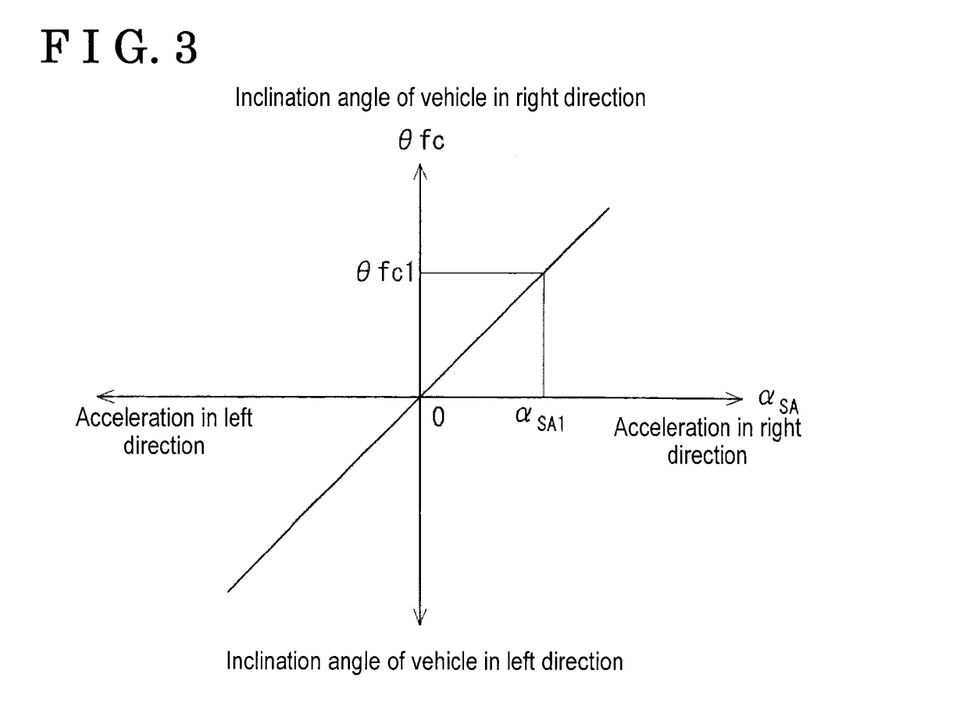
FIG. 3 is a graph showing a map used for obtaining a vehicle inclination angle in response to a vehicle lateral acceleration.

The angle estimation portion 42 of the controller 4 obtains the inclination angle θfc of the vehicle VE in the right-left direction based on a map shown in FIG. 3 from a vehicle acceleration αSA which corresponds to a detected value of the acceleration sensor 3 in order to detect a degree of unbalance of the load applied to the right portion and the left portion of the seat cushion 11. In FIG. 3, a right half of the lateral axis corresponds to the vehicle acceleration αSA of the vehicle VE in the right direction, and a left half of the lateral axis corresponds to the vehicle acceleration αSA in the left direction. An upper half of longitudinal axis corresponds to the inclination angle θfc (inclination angle in a case where the right side descends lower than the left side) of the vehicle VE in the right direction, and a lower half of the longitudinal axis corresponds to the inclination angle θfc (inclination angle in a case where the left side descends lower than the right side) of the vehicle VE in the left direction. The vehicle acceleration αSA in the right direction and the inclination angle θfc in the right direction have positive values, and the vehicle acceleration αSA in the left direction and the inclination angle θfc in the left direction have negative values. In FIG. 3, an inclination angle θfc1 in the right direction is obtained from a vehicle acceleration αSA1 in the right direction as an example. The map shown in FIG. 3 is stored in the memory portion 43 of the controller 4. The configuration including the acceleration sensor 3 and the angle estimation portion 42 corresponds to an unbalanced load detection device. However, the acceleration sensor 3 is not necessarily required for obtaining the inclination angle θfc of the vehicle VE in the right and left direction. Instead of the acceleration sensor 3, for example, a clinometer which is mounted to the vehicle VE may be used, or the steering and the vehicle acceleration may be detected and used for obtaining the inclination angle θfc of the vehicle VE in the right and left direction.

Figure 4:
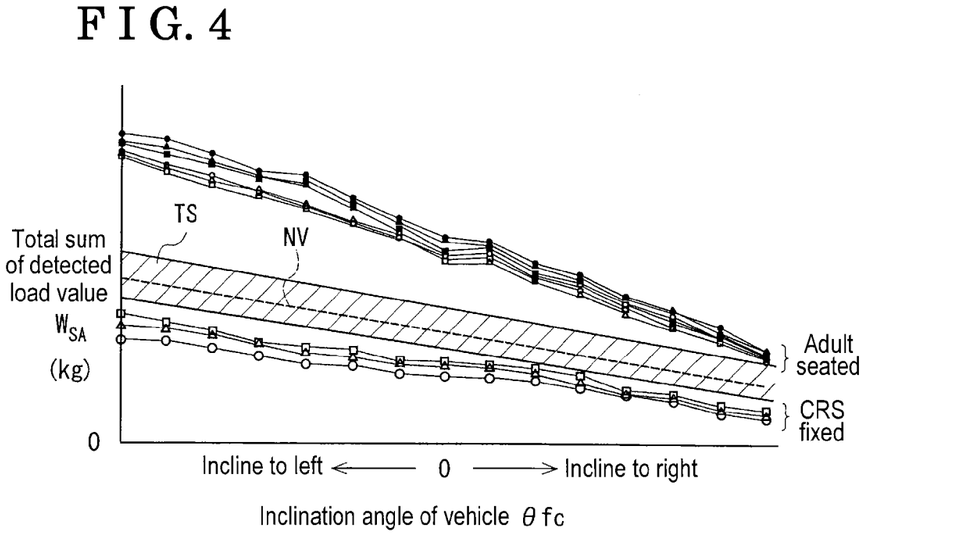
FIG. 4 is a graph showing a relationship between an inclination angle in a vehicle right-left direction and a total sum of a detected load value in a case where a threshold value range used for seat occupancy determination is corrected.
Figure 5:
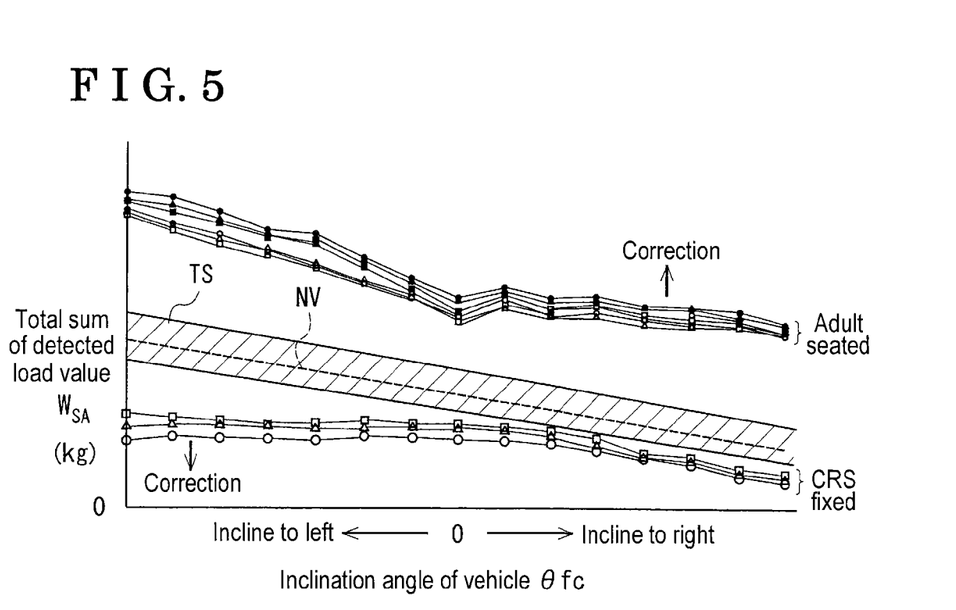
FIG. 5 is a graph showing the relationship between the inclination angle in the vehicle right-left direction and the total sum of the detected load value in a state where the total sum of the detected load value shown in FIG. 4 is corrected.

Next, the correction of the threshold value range TS by the threshold value setting portion 44 and the correction of the total sum WSA of the detected load value by the detection value correction portion 46 will be explained with reference to FIGS. 4 and 5. FIG. 4 shows a relationship between the inclination angle θfc in the vehicle right-left direction and the total sum WSA of the detected load value in a case where the threshold value range TS used for seat occupancy determination is corrected. FIG. 5 shows the relationship between the inclination angle θfc in the vehicle right-left direction and the total sum WSA of the detected load value in a state where the total sum WSA of the detected load value shown in FIG. 4 is corrected. FIGS. 4 and 5 are shown in the same manner as FIGS. 8 and 9 unless any notification is given. The threshold value setting portion 44 of the controller 4 sets the threshold value range TS based on the map shown in FIG. 4 from the inclination angle θfc of the vehicle VE in the right-left direction obtained by the angle estimation portion 42. The threshold value range TS (illustrated with hatching in FIGS. 4 and 5) is for determining whether an adult passenger is seated in the vehicle seat 1 or whether a child safety seat (indicated as CRS in FIGS. 4 and 5) is fixed to the vehicle seat 1 by the seat occupancy state determination portion 45 and corresponds to a threshold value of the total sum WSA of the detected load value. The threshold value setting portion 44 sets the threshold value range TS by correcting the threshold value range TS (shown in FIG. 8) in accordance with the inclination angle θfc in a state where the vehicle VE is not inclined or tilted in the right-left direction.

As shown in FIG. 4, in a case where the vehicle VE is inclined or tilted in the right direction where the seat occupancy sensors 2F, 2R are not provided, the threshold value range TS is corrected to move in a direction where the load decreases. In a case where the vehicle VE is inclined or tilted in the left direction where the seat occupancy sensors 2F, 2R are provided, the threshold value range TS is corrected to move in a direction where the load increases. The moving amount of the threshold value range TS is set to increase as long as an absolute value of the inclination angle θfc increases regardless of a case where the vehicle VE is inclined or tilted in the right direction or in the left direction. The map shown in FIG. 4 is stored in the memory portion 43 of the controller 4.

In an initial state of the seat occupancy determination device BH, that is, immediately after the ignition switch 8 is turned on, the determination of the seat occupancy state of the vehicle seat 1 is not performed. In those circumstances, the seat occupancy state determination portion 45 of the controller 4 determines that the vehicle seat 1 is seated by an adult passenger in a case where the total sum WSA of the load value detected by the seat occupancy sensors 2F, 2R is greater than the value of threshold value range TS corrected in accordance with the inclination angle θfc. That is, an airbag apparatus of the vehicle VE is operable. On the other hand, in a case where the total sum WSA of the load value detected by the seat occupancy sensors 2F, 2R is lower than the corrected value of threshold value range TS and the seat belt device is used, the seat occupancy state determination portion 45 determines that a child safety seat is fixed to the vehicle seat 1. Thus, the airbag apparatus of the vehicle VE is inoperable. Alternatively, the determination of the seat occupancy state of the vehicle seat 1 may include a condition where the total sum WSA of the detected load value continues a predetermined relationship with the corrected threshold value region TS for a predetermined time or more.

As described above, in a case where the determination of the seat occupancy state of the vehicle seat 1 is performed for the second time after determining the seat occupancy state of the vehicle seat 1 for the first time using the corrected threshold value range TS, the detection value correction portion 46 of the controller 4 corrects the total sum WSA of the detected load value in response to the inclination angle θfc of the vehicle VE in the right-left direction as shown in FIG. 5. As shown in FIG. 5, in a case where the vehicle VE is inclined or tilted in the right direction where the seat occupancy sensors 2F, 2R are not provided, the total sum WSA of the detected load value is corrected to increase as long as it is determined that the vehicle seat 1 is seated by an adult passenger in the immediately preceding determination. In a case where it is determined that a child safety seat is fixed to the vehicle seat 1 in the immediately preceding determination, the total sum WSA of the detected load value is not corrected. On the other hand, in a case where the vehicle VE is inclined or tilted in the left direction where the seat occupancy sensors 2F, 2R are provided, the total sum WSA of the detected load value is corrected to decrease as long as it is determined that a child safety seat is fixed to the vehicle seat 1 in the immediately preceding determination. In a case where it is determined that the vehicle seat 1 is seated by an adult passenger in the immediately preceding determination, the total sum WSA of the detected load value is not corrected. The increasing amount and decreasing amount of the total sum WSA of the detected load value are set to be high as the absolute value of the inclination angle θfc increases regardless of a case where the vehicle VE is inclined in the right direction or in the left direction. Alternatively, the increasing amount and decreasing amount of the total sum WSA of the detected load value may be set to a predetermined amount regardless of the inclination angle θfc of the vehicle VE. In FIG. 5, in a case where the inclination angle θfc of the vehicle VE in the right-left direction corresponds to zero, the total sum WSA of the detected load value are not corrected.

In a case where the corrected total sum WSA of the detected load value is greater than the corrected value of the threshold value range TS, it is determined that the vehicle seat 1 is seated by an adult passenger. In a case where the corrected total sum WSA of the detected load value is lower than the corrected value of the threshold value range TS, and the seat belt device is in use, it is determined that a child safety seat is fixed to the vehicle seat 1.

Figure 6:
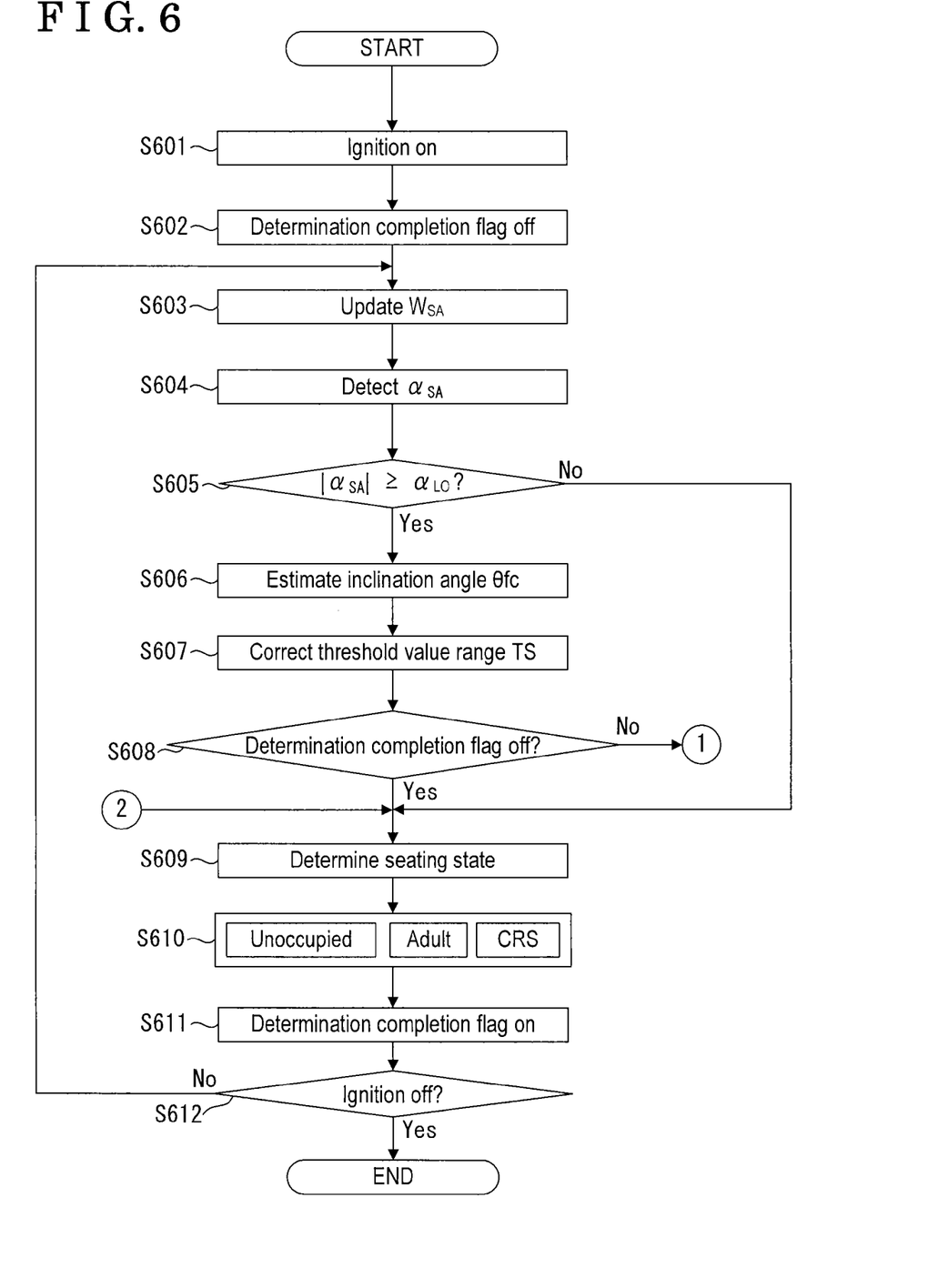
FIG. 6 is a main flowchart showing a correction method of the threshold value range.
Figure 7:
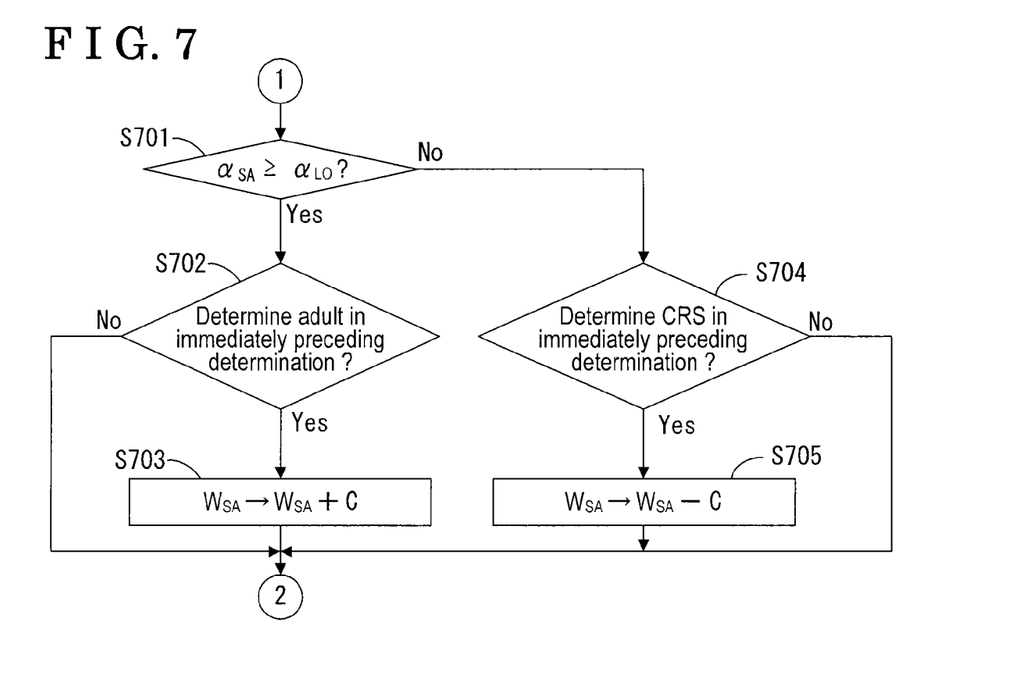
FIG. 7 is a sub flowchart showing a correction method of the total sum of the detected load value.

Next, a seat occupancy determination method of the vehicle seat 1 using the controller 4 will be explained with reference to FIGS. 6 and 7. When the ignition switch 8 of the vehicle VE is turned on (Step S601), the determination completion flag is turned off (Step S602). Next, the total sum WSA is calculated using the load value detected by the seat occupancy sensors 2F, 2R (Step S603). Then, the vehicle acceleration αSA detected by the acceleration sensor 3 is inputted to the controller 4 (Step S604), and whether the absolute value |αSA| of the vehicle acceleration αSA is equal to or greater than a value αLO (positive value) which is approximately close to zero (Step S605) is determined.

In a case where the absolute value |αSA| is equal to or greater than the value αLO, as aforementioned, the estimation (calculation) of the inclination angle θfc is performed from the vehicle acceleration αSA (Step S606) because the vehicle VE is inclined or tilted in the right-left direction. Once the inclination angle θfc of the vehicle VE is obtained, whether the determination completion flag is off (Step S608) after the threshold value range TS is corrected (Step S607) is determined. In a case where the seat occupancy state determination is performed for the first time and the determination completion flag is off, the seat occupancy state determination is performed in Step S609. In a case where the absolute value |αSA| is lower than the value αLO in Step S605, the Steps S606 to S608 are skipped because the vehicle VE is assumed not to incline in the right-left direction and the seat occupancy state determination is performed without correcting the threshold value TS.

After the seat occupancy state determination is performed and whether the vehicle seat 1 is not occupied, the vehicle seat 1 is seated by an adult passenger, or a child safety seat is fixed to the vehicle seat 1 (Step S610) is determined, the determination completion flag is turned on (Step S611). Then, whether the ignition switch 8 of the vehicle VE is turned off (Step S612) is determined. In a case where the ignition switch 8 remains to be on, the program returns to Step S603 and updates the total sum WSA of the detected load value. In a case where the ignition switch 8 is turned off, the seat occupancy determination method is terminated.

On the other hand, in a case where the determination completion flag is on in the Step S608, the program proceeds to step S701 and determines whether the vehicle acceleration αSA is equal to or higher than the value αLO (see FIG. 7) because the seat occupancy state determination is assumed not to be performed for the first time. In a case where the vehicle acceleration αSA is equal to or higher than the value αLO, the acceleration sensor 3 detects the acceleration of the vehicle VE in the right direction because the vehicle acceleration αSA corresponds to a positive value. Thus, the program proceeds to Step S702 and determines whether the vehicle seat 1 is seated by an adult passenger in the immediately preceding seat occupancy state determination. In a case where the vehicle seat 1 is seated by an adult passenger in the immediately preceding seat occupancy state determination, the total sum WSA of the detected load value is corrected to increase by the correction amount of C (Step S703) before the program returns to Step S609 to operate the seat occupancy status determination. In a case where the vehicle seat 1 is not seated by an adult passenger in the immediately preceding seat occupancy state determination, the program returns to Step S609 without correcting the total sum WSA of the detected load value.

In a case where the vehicle acceleration αSA is lower than the value αLO in Step S701, the acceleration sensor 3 detects the vehicle acceleration αSA in the left direction because the vehicle acceleration αSA corresponds to a negative value. Thus, the program proceeds to Step S704 and determines whether a child safety seat is fixed to the vehicle seat 1 in the immediately preceding seat occupancy state determination. In a case where a child safety seat is fixed to the vehicle seat 1 in the immediately preceding seat occupancy state determination, the total sum WSA of the detected load value is corrected to decrease by the correction amount of C (Step S705) before the program returns to Step S609 to operate the seat occupancy state determination. In a case where it is determined that a child safety seat is not fixed to the vehicle seat 1 in the immediately preceding seat occupancy state determination, the program returns to Step S609 without correcting the total sum WSA of the detected load value. In Steps S703 and S705, the total sum WSA of the detected load value increases or decreases by the correction amount of C. However, as described above, the amount of C does not correspond to a fixed value but a value being set in response to the inclination angle θfc of the vehicle VE. In the embodiment, the correction amount C is set to be greater as the absolute value of the inclination angle θfc is greater.

According to the seat occupancy determination device BH of the embodiment, the threshold value setting portion 44 corrects the threshold value range TS in response to the degree of unbalance of the load applied to the right portion and the left portion of the seat cushion 11 based on the detected signals transmitted from the acceleration sensor 3. Accordingly, the threshold value range TS may be corrected in accordance with the characteristics of the load increasing and decreasing due to the unbalance of the load. As a result, the calculated total sum WSA of the detected load value may be prevented from entering into the threshold value range TS and the determination of the seat occupancy state of the vehicle 1 can be performed precisely. Further, in contrast to a construction where the total sum WSA of the detected load value is corrected, the threshold value range TS may be corrected when the seat occupancy state determination is not performed yet, that is, when the seat occupancy state determination is performed for the first time. Accordingly, the determination of the seat occupancy state of the vehicle seat 1 can be performed precisely in a state where the seat occupancy determination device BH is in an initialization state.

After the seat occupancy state determination portion 45 determines the seat occupancy state of the vehicle seat 1, the detection value correction portion 46 corrects the calculated total sum WSA of the detected load value in response to the determined seat occupancy state of the vehicle seat 1 and the degree of unbalance of the load applied to the right and left portions of the seat cushion 11. Accordingly, even if the unbalance of the load applied to the right and left portions of the seat cushion 11 is large, the threshold value range TS and the total sum WSA of the detected load value are corrected to prevent the calculated total sum WSA of the detected load value from entering into the threshold value range TS. Thus, the determination of the seat occupancy state of the vehicle seat 1 can be further precisely performed.

In a case where it is detected that the vehicle VE starts operation based on detected signals transmitted from the ignition switch 8 of the vehicle VE, the threshold value setting portion 44 corrects the threshold value range TS in response to the degree of unbalance of the load applied to the right and left portions of the seat cushion 11. Accordingly, the determination of the seat occupancy state of the vehicle seat 1 can be performed precisely in a state where the seat occupancy determination device BH is in the initialization state.

When the vehicle VE is inclined or tilted in the right direction and it is determined that the load is disproportionally applied to the side of the cushion 11 where the seat occupancy sensors 2F, 2R are not provided, the detected value correction portion 46 increases the calculated total sum WSA of the detected load value in a case where it is determined that the vehicle seat 1 is seated by an adult passenger in the immediately preceding determination. On the other hand, when the vehicle VE is inclined or tilted in the left direction and it is determined that the load is disproportionally applied to the side of the cushion 11 where the seat occupancy sensors 2F, 2R are provided, the detected value correction portion 46 decreases the calculated total sum WSA of the detected load value in a case where it is determined that a child safety seat is fixed to the vehicle seat 1 in the immediately preceding determination. Accordingly, the calculated total sum WSA of the detected load value may be corrected minimally.

According to the seat occupancy determination method of the embodiment, the degree of unbalance of the load applied to the right and the left portions of the seat cushion 11 is detected in response to the vehicle acceleration αSA, and the threshold value region TS may be corrected in response to the degree of unbalance of the load applied to the right and the left portions of the seat cushion 11. Accordingly, the threshold value range TS may be corrected in accordance with the characteristics of the load increasing and decreasing due to the unbalance of the load. As a result, the calculated total sum WSA of the detected load value may be prevented from entering into the threshold value range TS. Thus, the determination of the seat occupancy state of the vehicle 1 can be performed precisely.

This disclosure is not limited to the aforementioned embodiment and may be modified or extended as follows. The seat occupancy determination device BH is applicable in a case where the vehicle VE includes three or more vehicle seats placed next to each other in the right-left direction. The seat occupancy determination device BH is applicable to a vehicle seat in which a passenger is seated to face the rear of the vehicle VE. Further, the seat occupancy determination device BH is applicable to a center seat or a rear seat in addition to the passenger seat for the vehicle.

The seat occupancy sensors 2F, 2R may be a pressure sensor detecting pressure applied to the seat cushion 11 when a passenger is seated. Then, the load applied to the seat cushion 11 may be indirectly detected by the detected pressure. Alternatively, the seat occupancy sensors 2F, 2R may be a displacement sensor detecting a displacement of the seat cushion 11. Then, the load applied to the seat cushion 11 may be indirectly detected from the displacement amount resisting biasing force applied by a seat spring. The detected load value WSA may be an average value of the load detected by each of the seat occupancy sensors 2F, 2R. This disclosure is applicable to a seat occupancy state determination other than for distinguishing whether the vehicle seat is seated by an adult passenger or whether a child safety seat is fixed to the vehicle seat 1. For example, this disclosure is applicable to a seat state determination which distinguishes whether the vehicle seat 1 is seated by an adult, an infant or a child, or whether the vehicle seat 1 is occupied by an adult passenger or a baggage. The straight line NV (see FIG. 4) dividing the determination range may be corrected in response to the degree of unbalance of the load applied to the right and left portions of the seat cushion 11. Accordingly, the determination of the seat occupancy state of the vehicle seat 1 can be performed by comparing the total sum WSA of the detected load value with the corrected straight line NV.

According to the aforementioned embodiment, the seat occupancy determination device (BH) configured to be provided at one of the seating portions (seat cushion 11) of the plural vehicle seats (1) of the vehicle (VE), the plural vehicle seats (1) mounted to the vehicle (VE) to be placed next to each other in the right-left direction, the plural vehicle seats (1) in which a passenger is seated to face the front or the rear of the vehicle (VE) includes the pair of seat occupancy amount detection devices (seat occupancy sensors 2F, 2R) configured to be provided at the front portion and the rear portion of one of the right side and the left side of the vehicle seat (1), the pair of seat occupancy amount detection devices (seat occupancy sensors 2F, 2R) detecting the seat occupancy amount increasing and decreasing in response to the change of the load applied to each portion of the seating portion (seat cushion 11), the seat occupancy threshold value setting device (threshold value setting portion 44) setting the seat occupancy threshold value (threshold value range TS) which corresponds to the threshold value of the seat occupancy amount, the seat occupancy state determination device (seat occupancy state determination portion 45) determining the seat occupancy state of the vehicle seat (1) by comparing the seat occupancy calculation amount (total sum WSA of the detected load value) calculated based on the detected signal transmitted from the pair of seat occupancy amount detection devices (seat occupancy sensors 2F, 2R) with the seat occupancy threshold value (threshold value range TS), and the unbalanced load detection device (acceleration sensor 3, angle estimation portion 42) detecting the degree of unbalance of the load applied to the right portion and the left portion of the seating portion (seat cushion 11) in response to the state of the vehicle (VE). The seat occupancy threshold value setting device (threshold value setting portion 44) corrects the seat occupancy threshold value (threshold value range TS) in response to the degree of unbalance of the load applied to the right portion and the left portion of the seating portion (seat cushion 11) based on the detected signal transmitted from the unbalanced load detection device (acceleration sensor 3, angle estimation portion 42). According to this disclosure, the seat occupancy state of the vehicle seat 1 refers to a state where the vehicle seat 1 is seated by an adult, an infant or a child, where a child safety seat is fixed to the vehicle seat 1, where the vehicle seat 1 is occupied with a baggage, or the vehicle seat 1 is unoccupied. According to this disclosure, the seat occupancy sensors 2F, 2R may detect either the load applied to the seating portion or a physical quality increasing and decreasing in response to the change of the load applied to the seating portion, for example, the change by the pressure applied to the seating portion or by the displacement of the seating portion. The threshold value range TS may be a threshold value relating to the load applied to the seating portion, or a threshold value relating to, for example, the pressure applied to the seating portion or the displacement of the seating portion. Alternatively, the seat occupancy state determination portion 45 may determine the seat occupancy state of the vehicle seat 1 by comparing the load applied to the seating portion with the corresponding threshold value, or by comparing, for example, the pressure applied to the seating portion or the displacement of the seating portion with the corresponding threshold values, respectively.

According to the aforementioned embodiment, the threshold value setting portion 44 corrects the threshold value range TS in response to the degree of unbalance of the load applied to the right and left portions of the seating portion based on the detected signals transmitted from the acceleration sensor 3. Accordingly, the threshold value range TS may be corrected in accordance with the characteristics of the load increasing and decreasing due to the unbalance of the load. As a result, the calculated total sum WSA of the detected load value may be prevented from entering into the threshold value range TS. Thus, the determination of the seat occupancy state of the vehicle seat 1 can be precisely performed.

According to the aforementioned embodiment, the seat occupancy determination device (BH) further includes the seat occupancy amount correction device (detection value correction portion 46) correcting the seat occupancy calculation amount (total sum WSA of the detected load value) in response to the determined seat occupancy state of the vehicle seat (1) and the degree of unbalance of the load applied to the right portion and the left portion of the seating portion (seat cushion 11) after the seat occupancy state determination device (seat occupancy state determination portion 45) determines the seat occupancy state of the vehicle seat (1). The detected value correction portion 46 may correct the calculated load applied to the seating portion, or may correct, for example, the pressure applied to the seating portion, or the displacement of the seating portion.

After the seat occupancy state determination portion 45 determines the seat occupancy state of the vehicle seat 1, the detection value correction portion 46 corrects the calculated total sum WSA of the detected load value in response to the determined seat occupancy state of the vehicle seat 1 and the degree of unbalance of the load applied to the right and left portions of the seat cushion 11. Accordingly, even if the unbalance of load applied to the right and left portions of the seat cushion 11 is large, the threshold value range TS and the total sum WSA of the detected load value are corrected to prevent the calculated total sum WSA of the detected load value from entering into the threshold value range TS. Thus, the determination of the seat occupancy state of the vehicle seat 1 can be further precisely performed.

According to the aforementioned embodiment, the seat occupancy determination device (BH) further includes the starting operation detection device (ignition switch 8) detecting a starting operation of the vehicle (VE), wherein the seat occupancy threshold value setting device (threshold value setting portion 44) corrects the seat occupancy threshold value (threshold value range TS) in response to the degree of unbalance of the load applied to the right portion and the left portion of the seating portion (seat cushion 11) in a case where it is detected that the vehicle (VE) starts operation based on the detected signal transmitted from the starting operation detection device (ignition switch 8).

In a case where it is detected that the vehicle VE starts operation based on the detected signals transmitted from the ignition switch 8 of the vehicle VE, the threshold value setting portion 44 corrects the threshold value range TS in response to the degree of unbalance of the load applied to the right and left portions of the seat cushion 11. Accordingly, the determination of the seat occupancy state for the vehicle seat 1 can be performed precisely in a state where the seat occupancy determination device BH is in the initialization state.

According to the aforementioned embodiment, the seat occupancy state determination device (seat occupancy state determination portion 45) determines that the vehicle seat (1) is seated by an adult passenger in a case where the seat occupancy calculation amount (total sum WSA of the detected load value) is greater than the seat occupancy threshold value (threshold value range TS) by comparing the seat occupancy calculation amount (total sum WSA of the detected load value) with the seat occupancy threshold value (threshold value range TS). The seat occupancy state determination device (seat occupancy state determination portion 45) determines that a child safety seat is fixed to the vehicle seat (1) in a case where the seat occupancy calculation amount (total sum WSA of the detected load value) is lower than the seat occupancy threshold value (threshold value range TS) by comparing the seat occupancy calculation amount (total sum WSA of the detected load value) with the seat occupancy threshold value (threshold value range TS). The seat occupancy amount correction device (detection value correction portion 46) increases the seat occupancy calculation amount (total sum WSA of the detected load value) in a case where it is determined that the vehicle seat (1) is seated by an adult passenger in the immediately preceding determination when it is detected that the load is disproportionally applied to the side where the pair of seat occupancy amount detection devices (seat occupancy sensors 2F, 2R) is not provided in the right-left direction of the seating portion (seat cushion 11). The seat occupancy amount correction device (detection value correction portion 46) decreases the seat occupancy calculation amount (total sum WSA of the detected load value) in a case where it is determined that a child safety seat is fixed to the vehicle seat (1) in the immediately preceding determination when it is detected that the load is disproportionally applied to the side where the pair of seat occupancy amount detection devices (seat occupancy sensors 2F, 2R) is provided in the right-left direction of the seating portion (seat cushion 11). According to this disclosure, a child safety seat is fixed to the vehicle seat 1 in a manner that a child safety seat is positioned on the vehicle seat 1, the belt locking tongue of the seat belt device engages with the buckle, and a child safety seat is fixed by the seat belt device.

According to the aforementioned embodiment, when it is detected that the load is disproportionally applied to the side of the cushion 11 in the right-left direction where the seat occupancy sensors 2F, 2R are not provided, the detected value correction portion 46 increases the calculated total sum WSA of the detected load value in a case where it is determined that the vehicle seat 1 is seated by an adult passenger in the immediately preceding determination. On the other hand, when it is detected that the load is disproportionally applied to the side of the cushion 11 where the seat occupancy sensors 2F, 2R are provided, the detected value correction portion 46 decreases the calculated total sum WSA of the detected load value in a case where it is determined that a child safety seat is fixed to the vehicle seat 1 in the immediately preceding determination. Accordingly, the calculated total sum WSA of the detected load value may be corrected minimally.

According to the aforementioned embodiment, the unbalanced load detection device (acceleration sensor 3, angle estimation portion 42) includes the acceleration sensor (3) detecting the acceleration ($\alpha$SA1) of the vehicle (VE) in the right-left direction and the angle estimation portion (42) estimating the inclination angle ($\theta$fc, $\theta$fc1) of the vehicle (VE) in the right-left direction from the acceleration ($\alpha$SA1) detected by the acceleration sensor (3). The degree of unbalance of the load applied to the right portion and the left portion of the seating portion (seat cushion 11) corresponds to the inclination angle ($\theta$fc, $\theta$fc1).

According to the seat occupancy determination method of the embodiment, the degree of unbalance of the load applied to the right and the left portions of the seat cushion 11 is detected based on the state of the vehicle VE. Accordingly, the threshold value range TS may be corrected in response to the degree of unbalance of the load applied to the right and left portions of the seat cushion 11. Thus, the threshold value range TS may be corrected in accordance with the characteristics of the load increasing and decreasing due to the unbalance of the load. As a result, the calculated total sum WSA of the detected load value may be prevented from entering into the threshold value range TS. Thus, the determination of the seat occupancy state of the vehicle 1 can be performed precisely.

According to the aforementioned embodiment, the seat occupancy determination method using the pair of seat occupancy amount detection devices (seat occupancy sensors 2F, 2R) configured to be provided at the front portion and the rear portion of one of the right side and the left side of one of seating portions (seat cushion 11) of the plural vehicle seats (1) of the vehicle (VE), the plural vehicle seats (1) mounted to the vehicle (VE) to be placed next to each other in the right-left direction, the plural vehicle seats (1) in which a passenger is seated to face the front or the rear of the vehicle (VE) includes processes of detecting the seat occupancy amount increasing and decreasing in response to the change of the load applied to each portion of the seating portion (seat cushion 11) by the pair of seat occupancy amount detection devices (seat occupancy sensors 2F, 2R), comparing the seat occupancy calculation amount (total sum WSA of the detected load value) calculated based on the detected signal transmitted from the pair of seat occupancy amount detection devices (seat occupancy sensors 2F, 2R) with the seat occupancy threshold value (threshold value range TS) which corresponds to the threshold value of the seat occupancy amount to determine the seat occupancy state of the vehicle seat (1), detecting the degree of unbalance of the load applied to the right portion and the left portion of the seating portion (seat cushion 11) in response to the state of the vehicle (VE), and correcting the seat occupancy threshold value (threshold value range TS) in response to the degree of unbalance of the load applied to the right portion and the left portion of the seating portion (seat cushion 11).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupancy determination device configured to be provided at one of seating portions of a plurality of vehicle seats of a vehicle, the plurality of vehicle seats mounted to the vehicle to be placed next to each other in a right-left direction, the plurality of vehicle seats in which a passenger is seated to face a front or a rear of the vehicle, comprising:
    a pair of seat occupancy amount detection devices configured to be provided at a front portion and a rear portion of one of a right side and a left side of the vehicle seat, the pair of seat occupancy amount detection devices detecting a seat occupancy amount increasing and decreasing in response to a change of a load applied to each portion of the seating portion;
    a seat occupancy threshold value setting device setting a seat occupancy threshold value which corresponds to a threshold value of the seat occupancy amount;
    a seat occupancy state determination device determining a seat occupancy state of the vehicle seat by comparing a seat occupancy calculation amount calculated based on a detected signal transmitted from the pair of seat occupancy amount detection devices with the seat occupancy threshold value; and
    an unbalanced load detection device detecting a degree of unbalance of the load applied to a right portion and a left portion of the seating portion in response to an inclination angle of the vehicle in the right-left direction; wherein
    the seat occupancy threshold value setting device corrects the seat occupancy threshold value in response to the degree of unbalance of the load applied to the right portion and the left portion of the seating portion based on a detected signal transmitted from the unbalanced load detection device.

2. The seat occupancy determination device according to claim 1, further comprising:
    a seat occupancy amount correction device correcting the seat occupancy calculation amount in response to a determined seat occupancy state of the vehicle seat and the degree of unbalance of the load applied to the right portion and the left portion of the seating portion after the seat occupancy state determination device determines the seat occupancy state of the vehicle seat.

3. The seat occupancy determination device according to claim 1, further comprising:
    a starting operation detection device detecting a starting operation of the vehicle, wherein the seat occupancy threshold value setting device corrects the seat occupancy threshold value in response to the degree of unbalance of the load applied to the right portion and the left portion of the seating portion in a case where it is detected that the vehicle starts operation based on a detected signal transmitted from the starting operation detection device.

4. The seat occupancy determination device according to claim 2, further comprising:
    a starting operation detection device detecting a starting operation of the vehicle, wherein the seat occupancy threshold value setting device corrects the seat occupancy threshold value in response to the degree of unbalance of the load applied to the right portion and the left portion of the seating portion in a case where it is detected that the vehicle starts operation based on a detected signal transmitted from the starting operation detection device.

5. The seat occupancy determination device according to claim 2, wherein:
    the seat occupancy state determination device determines that the vehicle seat is sat in by an adult passenger in a case where the seat occupancy calculation amount is greater than the seat occupancy threshold value by comparing the seat occupancy calculation amount with the seat occupancy threshold value, and the seat occupancy state determination device determines that a child safety seat is fixed to the vehicle seat in a case where the seat occupancy calculation amount is lower than the seat occupancy threshold value by comparing the seat occupancy calculation amount with the seat occupancy threshold value; and
    the seat occupancy amount correction device increases the seat occupancy calculation amount in a case where it is determined that the vehicle seat is sat in by an adult passenger in an immediately preceding determination when it is detected that the load is disproportionally applied to a side where the pair of seat occupancy amount detection devices is not provided in the right-left direction of the seating portion, and the seat occupancy amount correction device decreases the seat occupancy calculation amount in a case where it is determined that a child safety seat is fixed to the vehicle seat in the immediately preceding determination when it is detected that the load is disproportionally applied to a side where the pair of seat occupancy amount detection devices is provided in the right-left direction of the seating portion.

6. The seat occupancy determination device according to claim 1, wherein:
    the unbalanced load detection device includes an acceleration sensor detecting an acceleration of the vehicle in the right-left direction and an angle estimation portion estimating the inclination angle of the vehicle in the right-left direction from the acceleration detected by the acceleration sensor; and
    the degree of unbalance of the load applied to the right portion and the left portion of the seating portion corresponds to the inclination angle.

7. A seat occupancy determination method using a pair of seat occupancy amount detection devices configured to be provided at a front portion and a rear portion of one of a right side and a left side of one of seating portions of a plurality of vehicle seats of a vehicle, the plurality of vehicle seats mounted to the vehicle to be placed next to each other in a right-left direction, the plurality of vehicle seats in which a passenger is seated to face a front or a rear of the vehicle, comprising processes of:
    detecting a seat occupancy amount increasing and decreasing in response to a change of a load applied to each portion of the seating portion by the pair of seat occupancy amount detection devices;
    comparing a seat occupancy calculation amount calculated based on a detected signal transmitted from the pair of seat occupancy amount detection devices with a seat occupancy threshold value which corresponds to a threshold value of the seat occupancy amount to determine a seat occupancy state of the vehicle seat;

detecting a degree of unbalance of the load applied to a right portion and a left portion of the seating portion in response to an inclination angle of the vehicle in the right-left direction; and correcting the seat occupancy threshold value in response to the degree of unbalance of the load applied to the right portion and the left portion of the seating portion.

* * * * *